(12) United States Patent
Milley et al.

(10) Patent No.: US 6,738,856 B1
(45) Date of Patent: May 18, 2004

(54) EXTERNAL DISPLAY PERIPHERAL FOR COUPLING TO A UNIVERSAL SERIAL BUS PORT OR HUB ON A COMPUTER

(75) Inventors: Nicholas A. Milley, Andover, MA (US); Thomas Lianza, Bedford, NH (US); Carl David Lutz, Derry, NH (US)

(73) Assignee: Sequel Imaging, Inc, Londonderry, NH (US)

( * ) Notice: Subject to any disclaimer, the term of this patent is extended or adjusted under 35 U.S.C. 154(b) by 318 days.

(21) Appl. No.: 09/618,680

(22) Filed: Jul. 19, 2000

Related U.S. Application Data

(63) Continuation-in-part of application No. 09/487,694, filed on Jan. 19, 2000, now abandoned, which is a continuation of application No. PCT/US00/01229, filed on Jan. 19, 2000
(60) Provisional application No. 60/116,270, filed on Jan. 19, 1999.

(51) Int. Cl.[7] .............................................. G06F 13/36
(52) U.S. Cl. ............................ 710/315; 710/1; 710/11; 710/106; 710/300; 710/105; 710/314; 710/316; 345/156; 713/300; 713/320; 307/31
(58) Field of Search .................... 710/105, 1, 11, 710/106, 300, 313–315; 315/219; 345/163, 165, 166, 156; 356/6, 243; 713/300, 320; 307/31

(56) References Cited

U.S. PATENT DOCUMENTS 4,716,527 A * 12/1987 Graciotti ..................... 703/25
5,428,368 A    6/1995 Grant (List continued on next page.)

OTHER PUBLICATIONS

Compaq, Intel, Microsoft, and NEC, "Universal Serial Bus Specification", 1998, p18.*
VGA/USB–A cable by InFocus, http://store.infocus.com/kore/catalog/Accessories/Cables/QRIH3WLMQ5OSACHX80Y/product.html, product shipping date as Jan. 2000.*
Bahl et al., Method and Apparatus for use in transmitting video information over a communication network, Oct. 1998, US2001/0016008.*
Belkin, USB Parallel Printer Adapter, Internet document, 4 pages.
In–System Design, ISD SmartCable for Printing, Internet document, 2 pages.
VESA, VESA Enhanced Extended Display Identification Data Standard, Release A, Sep. 2, 1999.
VESA, Enhanced Display Data Channel Standard, Version 1, Sep. 2, 1999.
VESA, Displat Data Channel Command Interface (DDC/CI) Standard, Version 1, Aug. 14, 1998.
VESA, VESA Monitor Control Command Set (MCCS) Standard, Version 1.0, Sep. 11, 1998.

*Primary Examiner*—Gopal C. Ray
*Assistant Examiner*—Justin King
(74) *Attorney, Agent, or Firm*—Maine & Asmus

(57) ABSTRACT

A cable, adapter, or converter device is disclosed that enables a peripheral device (e.g., external display) normally connected only through a non-USB port to communicate with a host computer via a USB port in addition to its non-USB port. DDC-formatted signals from the peripheral device are converted to the appropriate format for input through the USB port, and signals transmitted to the peripheral device from the USB port are converted to the format recognizable by the external peripheral, allowing access to peripheral features via the host system.

11 Claims, 5 Drawing Sheets

U.S. PATENT DOCUMENTS

| | | | |
|---|---|---|---|
| 5,513,302 A | * 4/1996 | Tsai | 358/1.15 |
| 5,573,425 A | 11/1996 | Morisawa et al. | |
| 5,605,473 A | 2/1997 | Kishon | |
| 5,717,428 A | 2/1998 | Barrus et al. | |
| 5,729,573 A | 3/1998 | Bailey et al. | |
| D396,689 S | 8/1998 | Karten et al. | |
| 5,838,926 A | 11/1998 | Yamagishi | |
| 5,841,424 A | 11/1998 | Kikinis | |
| 5,935,224 A | * 8/1999 | Svancarek et al. | 710/63 |
| 5,969,750 A | * 10/1999 | Hsieh et al. | 348/14.1 |
| 6,040,792 A | 3/2000 | Watson et al. | |
| 6,044,428 A | * 3/2000 | Rayabhari | 710/305 |
| 6,052,740 A | * 4/2000 | Frederick | 710/8 |
| 6,057,860 A | 5/2000 | Hoffert et al. | |
| 6,131,134 A | * 10/2000 | Huang et al. | 710/302 |
| 6,205,505 B1 | * 3/2001 | Jau et al. | 710/315 |
| 6,247,075 B1 | * 6/2001 | Wang et al. | 710/63 |
| 6,252,375 B1 | 6/2001 | Richter et al. | |
| 6,334,160 B1 | * 12/2001 | Emmert et al. | 710/11 |

* cited by examiner

EXTERNAL DISPLAY PERIPHERAL FOR COUPLING TO A UNIVERSAL SERIAL BUS PORT OR HUB ON A COMPUTER

CROSS REFERENCE TO RELATED APPLICATIONS

This application is a continuation-in-part of U.S. patent application Ser. No. 09/487,694, filed on Jan. 19, 2000, now abandoned, which is a continuation of PCT Patent Application PCT/US 00/01229 Jan. 19, 2000, which is incorporated herein by reference for all purposes. Both the U.S. patent application Ser. No. 09/487,694 and PCT Patent Application PCT/US 00/01229 claim the benefit of U.S. Provisional Application No. 60/116,270, filed on Jan. 19, 1999.

TECHNICAL FIELD OF THE INVENTION

The present invention relates generally to connecting an external peripheral to a universal serial bus (USB) port on a computer, and more specifically, to a system and apparatus for connecting a digitally controlled display peripheral to the USB port of a computer or a USB hub.

BACKGROUND OF THE INVENTION

The various capabilities and features of external computer peripherals sometimes must be accessed through a series of computer system components. In the current age of personal computer use, these components may be designed and produced by different companies and achieve some level of compliance to interchangability standards. At the same time, these non-standard components may not support access to all of the features of a particular manufacturers external peripheral. All such component manufactures make market related choices regarding which features and capabilities they choose to support. Ultimately, special niche markets and external peripherals that have applications to these markets, may not get supported by such component manufacturers.

A specific example concerns computer displays and their characteristics. Display peripheral vendors design advanced capability that often is not supported by operating system vendors or graphic card vendors. Typically, without support from such interim solution providers, advanced capabilities, which may not be mass market oriented, cannot find third party implementation for control software or interface means. Users must take additional steps to provide access to the advanced capability that increases cost or compromises accessibility.

For example, external display peripherals benefit from digital control from an attached host computer. While it is well known that photopic and/or calorimetric measurement and adjustment of display parameters can result in improvement of display capability, effecting such adjustment across various operating system software, third party software, and graphic cards can be quite complicated and may not be possible based on the capabilities of each.

Recent standards regarding implementation of display characteristics have been published by the Video Electronics Standards Association (VESA) committee, and are implemented by several display peripheral vendors. The VESA committee is a modem day standards organization active in developing standards for use in the display peripherals regardless of the specific display technology and across many communication protocols and interfaces. Standards organizations have allowed for many popular features to be implemented by multiple manufacturers in a standard fashion in response to end user plug and play needs.

Most modern display devices include digital control features such as the capability to power down, at least partially, after a period on non-use in order to save energy and increase the useful product life. At least some modern devices also allow the identification of manufacturer make and model via a digital electronic interface so that host systems can automatically detect and operate the peripheral in optimum fashion.

Access to these controls is allowed through signals that are transmitted through the cable that connects the display peripheral to computer. Often the computer may have a supplemental graphics card included to which the cable connects. This graphics card and its controls must support or pass functions for them to be available downstream.

In the specific area of digital electronic control of display devices, such as cathode ray tubes (CRT's), liquid crystal displays (LCD's), and Plasma Display Panel (PDP's), VESA has developed and continues to issue revisions to the "Display Data Channel" ('DDC') specifications. The specification of these control signals includes the communication protocol, connector style, signal definition and pin assignments in order to conform to the particular version of the standard. A recent communication protocol known as "I2C" has been adopted to communicate these DDC commands to the graphic host, often a graphics card internal to the host computer.

Typically, the graphic host, whether it be an add in graphics display card for the host or a built in graphics capability to the motherboard of the host computer, interfaces with the display device over this protocol to receive and transmit digital commands which control many aspects regarding how data is displayed by the display peripheral. The graphics host must communicate through operating system software to the host computer to allow such settings to be selected, either by user interaction or automatic plug and play selection through host computer. Advances in wireless and Internet communications also provide remote access and communication.

In an environment where multiple manufacturers supply various components of computer systems, such as graphic cards, host computers, operating system software, and display devices the benefits of such popular standards to the end user are clear. Users benefit from standard implementation of common features because component selection is competitive and plug and play operation is possible once all manufacturers comply with the standard. However, less popular or more complex functions may not get adopted by such industry based standards organizations or incorporated by the manufacturers.

For example, display manufacturers may choose to implement features in addition to those that have been adopted by the standard organizations to give their current products a competitive market edge over other manufacturers. Additionally, since VESA consists of industry members from profit based firms, there may be competitive reasons for one manufacturer to favor, promote, or not disclose some enhancement to the DDC specification.

One such example of this is the scale display command. This is a generic command that scales the geometry of the electronic display so that it fits the available screen real estate. The standards organization has defined this command both for horizontal and vertical directions. At least one display peripheral manufacturer has implemented this command in both the standards fashion as well as in its own format, referring to it as a 'zoom' command, possibly perceiving this presentation to more intuitive to the user.

Since the DDC format is well known by anyone skilled in the art, detecting the byte order of the combined command, which sets both the vertical and horizontal standardized commands simultaneously, is not difficult.

A disadvantage of the present methods by which VESA standards are implemented is that many manufacturers must support a feature of the DDC to allow end users to remotely access its settings. Typically a command to set a color related aspect of the display device is set directly at the push button control panel of the display peripheral or through user interface to the host computer. If the particular display implements a manual control panel the user can, at the display manufacturer's option, set these parameters locally, but not remotely. Often the manual control panel feature carries substantial cost to the display peripheral manufacturer and it is difficult to cost justify the inclusion for markets wherein only a small portion of users make use of such features. In order for the user to set such features at the host computer, both the operating system and the graphic host must support calls to the feature contained in the display device.

In the prior example regarding geometry 'zoom' of the display, the user could only set this parameter remotely if the operating system software or its extensions allowed the user to enter the command. The graphic host would also have to relay this command to the display peripheral. Manufacturers often use graphic display cards or third party graphic host devices added into the host computer that are unable or unwilling to support every nonstandard command from every display peripheral manufacturer. Ultimately, a disadvantage to end users is that only standard commands are routinely available for setting display parameters remotely or that costs will be higher than it might otherwise be for such features.

There have been several attempts to reduce the aforementioned problems. U.S. Pat. No. 5,717,428 ('428) describes a keyboard with some electronics and cabling to support various types of computers. The '428 invention is intended as a keyboard that may be used remotely from a computer and store the typed input. Upon physical connection to a host computer, the buffer is transmitted to the computer. As the keyboard is designed for different types of computers, there is appropriate conversion circuitry to enable the transmission and cables that support the host computer.

Another keyboard patent, U.S. Pat. No. 5,841,424, discloses a keyboard that serves as a USB docking station. The keyboard houses the necessary translation circuitry and multiple connectors.

U.S. Pat. No. 5,729,573 ('573) discloses a system for increased transmission rates via a pair of parallel cables and associated circuitry. This invention encompasses a separate central processing unit (CPU) with memory to control parallel data transfer between a host computer and it computer peripheral devices.

U.S. Pat. No. 5,838,926 ('926) is a network methodology for organizing computer peripherals on the network. The most appropriate peripheral can be selected among the various networked peripherals.

A USB converter device is described in U.S. Pat. No. 5,935,224, wherein non-USB peripheral devices can be connected and communicate with the host computer via a USB port. The '224 patent primarily focuses on game ports, but discusses a converter that attaches to a cable and has a data acquisition interface, a microcontroller, a USB engine and a USB transceiver.

However, none of the prior art designs have adequately addressed accessing unique display peripheral controls through a USB interface. What is needed is a cost-effective device that can provide access to digital display peripheral controls that are not otherwise accessible. Such a device should permit integration into existing designs and also allow usage by existing display peripherals. The interface should employ a bypass means to permit existing controls and only operate when the special controls are required or requested.

SUMMARY OF THE INVENTION

In accordance with the present invention, an apparatus and system for the control of and communication with a DDC display peripheral via USB is disclosed. In one preferred embodiment, a cable is defined for use in coupling a display peripheral to a computer. The cable passes all typical display signals from the display peripheral to the computer through typical means. The cable can be fixedly attached at the display end or have a plug and mating receptacle. The cable also has a means of providing a USB connection either by a jumper cable with a male USB connector, or a female USB connection.

An alternate embodiment is an adapter that attaches to the existing display peripheral cable and has the necessary mating connectors for USB. The adapter can connect at either end of the cable when the cable is not fixedly attached to the display peripheral device, making the USB interface accessible at either the computer or the display peripheral device.

The present invention is aimed at providing access to display controls allowed through signals that are transmitted through the cable that connects the display peripheral to the computer. The display control signals are broken out of the typical information chain and converted to an alternate communication protocol.

A circuit is embedded in the device that receives USB signals and messages from the host CPU via USB and translates these USB signals and messages into DDC signals and messages for transmission to the display peripheral. The same circuit receives DDC signals and messages from the display peripheral and translates them into USB signals and messages for the host CPU. In one embodiment display peripheral connection to the USB port or hub is provided by a third lead or connector on the display peripheral/computer cable. Internal to the USB circuitry is a microprocessor that acts as a universal serial bus transceiver and controller that operates to change the format of data and provide data exchange control from display peripheral to the computer. This allows display peripheral characteristics to be controlled by user activated software which may be resident on the computer or remotely on a network, or via the Internet or wireless means.

There are many benefits to the implementation of such USB processing. The display peripheral manufacturer benefits because the advanced display control features, both standard and proprietary, can be implemented without support from operating system companies and graphic card companies. Time to market is decreased because there is no need to work with other companies to implement the advanced controls in the operating system of graphics cards. The intellectual property protection is improved because proprietary information and trade secrets do not have to be revealed to other parties. Additionally, there is no need for the display peripheral manufacturer to include a costly manual pushbutton control panel within each display peripheral, as the computer to host cable contains all requirements. The benefit to the customer or user is twofold, a greater field of choice to access the advanced display options across all user seats, and access to an increased number of solution providers who may offer them greater selection.

There are instances wherein display peripheral manufacturers depart from the accepted standard connector and/or pin arrangements. In these situations, alternative embodiments include adapters that encompass with internal wiring that alters the signal carried by one or more pins. These display peripherals include relatively high-resolution monochrome display peripherals in use today for medical imaging as well as some color display peripherals uniquely dedicated to non-PC systems, for example, those serving the UNIX operating systems.

Alternate embodiments are provided as adapters containing a connection to, or port for, other types of sensors, for example a coincidence sensor, that are used for measuring and subsequently correcting R, G, B electron beam alignment of color display devices.

Alternate embodiments are provided as cables or adapters that enable connection of devices in which the invention's microprocessor is used to provide either in-part or in-total the processing power of the external device. An example is the connection of an external light sensor which gains some signal processing or manipulation by the imbedded cable/adapter microprocessor.

The present invention allows alternate access to the DDC signals. The signals 'pass through' the converter to allow conventional access by whatever means might otherwise be employed, however, and of main interest in high end display imaging, the signals are also accessible via the Universal Serial Bus. The converter includes translation means from the I2C protocol to the USB protocol and communications means to transmit and receive in both protocols as required to read and set parameters within the display.

Physically, the converter resides between the graphic host and the display peripheral, either integrated in the display peripheral cable or as an adapter that mates to the cable and connects to either the display peripheral or graphic host. Branching off from this circuit is a USB compatible wire bundle and plug that mates to a USB port or hub in standard fashion. The converter may contain additional input/output (I/O). In a preferred embodiment the circuit is built into a VGA display cable and contains no other inputs or outputs. In an alternate embodiment, the circuit is built into a small box or adapter where it may also have an additional plug to connect a light measuring device capable of measuring and returning data regarding the display.

Regardless of whether the device utilizes light measurement data, the DDC signals after conversion from I2C are available to the host. And, these DDC signals are also accessible, with appropriate connection, to the Internet through the USB connection of the converter. The DDC information can be sent from the Internet or host to the display device through the USB protocol via the converter. This allows for remote control of digital display devices, both in terms of asset control as well as display standardization. This satisfies a key to successful remote hardcopy color printing—successful color soft proofing at multiple sites. The DDC information can be transmitted to multiple sites so that the display characteristics of the original site can be used to re-create the original display on other systems.

Additionally, the present device also has applications in insuring monochrome images for medical imaging applications among others, are similarly displayed in multiple locations where it is necessary to optimize the display with respect to the maximum number of shades of gray that are displayed. Providing Internet access permits a group of persons to coordinate various display peripheral displays and different host systems to adhere to the parameters of single display so all users see the same image.

One of the unique aspects of the present invention is that some signals, but not all, pass through the converter circuit to be otherwise accessible by the host, or graphic host in otherwise normal fashion. This feature derives from the manner in which the circuit is powered and whether all ports from the circuit are connected to the intended port. Electronic switches are powered closed in order to achieve electronic continuity on lines that may not otherwise be accessed by the host. The power to close these switches must be available from the non-USB host connection since there is no guarantee that a USB port is available. This ensures the cable or adapter will allow normal R, G, B operation of a display peripheral even though the USB port is not connected.

The present invention accomplishes the selective passing of signals in the disclosed circuit by allowing the switches to be powered by any potential power or signal line. Power to initialize the processor is derived only from the USB port. Thus, if the converter is not powered by the USB source, the processor is not active, but the switches are powered closed allowing normal host to display peripheral signals to 'pass through' the circuit. Additionally, when the processor is powered and active, the switches are normally closed. Since the display peripheral behaves as a slave device, it only transmits data when polled. In this way the switches can be opened at known times to allow communication directly from converter to display peripheral and USB port which is not presented to the graphic host.

Another purpose of the present invention is to allow identification of display peripheral capabilities through such a converter. Since it is possible to remotely poll display devices and remotely set parameters in display devices, it is also possible to identify display peripheral type and capability remotely to the extent unique features can be identified. For example, if only one family of display peripherals from one manufacturer responds to a command used to set 'zoom' on its displayable screen area, rather than setting vertical and horizontal scale parameters separately, then by polling, setting, and re-polling, it is possible to identify that display peripheral type remotely. Additionally, if other known differences exist between models within that manufacturers display peripheral family, then it is also be possible to remotely detect model type. Additionally it is possible to identify individual display devices should unique identification means be known such as a serial number. Although this type of identification is known utilizing other means, it is an object of the present invention to the extent that display devices are identified through a DDC/USB converter.

An additional object is to provide remote access and communications to the display via wireless and Internet communications. The technological improvements in the communications arena enable high-speed and secure communications over the Internet to permit users to coordinate displayed images.

The present invention converts DDC signals from and to USB protocol and allows access of the translated DDC signals through a USB port connection. Support requirements from third parties are thus greatly simplified because they can now access and control signals that are unsupported and would be too costly to implement. The graphics host and operating system need not support any DDC standards, as the USB interface can control the display peripheral. The USB protocol and connection means must be present in the host computer, but this is a widely accepted standard. Legacy issues for previous I/O options on computers have been well documented by prior art that converts peripherals meant for one communication protocol to the more modern USB protocol. However, much of the focus of the prior art involved easing change over requirements as the new serial bus came into widespread use. The present invention utilizes the USB protocol to circumvent support requirements from manufactures that have not implemented DDC support, or have implemented alternate variations of DDC support.

One object of the invention is a signal converter for converting Uniform Serial Bus (USB) communication and display peripheral communication between a host and a display peripheral, comprising a power management section for providing power to the signal converter, a connection between the display peripheral and the host, wherein the connection also couples to a USB interface. There is a switching section for maintaining standard communications between the display peripheral and the host, wherein the switching section switches to the USB interface allowing communication between the host and the display peripheral through the USB interface. There is also a controller for managing the switching section and translating the USB communication to the display peripheral communication and translating display peripheral communication to the USB communication.

A further object is a signal converter, wherein the display peripheral communication complies with Video Electronics Standards Association (VESA) Display Data Channel (DDC) communications protocol.

Additionally, another object is a signal converter, wherein the switching section is in a default position for maintaining the standard communications.

An object includes a signal converter, wherein the power management section employs power scavenging capability to extract power from multiple signal lines as well as standard sources of power.

A further object is a signal converter, wherein the USB interface is integrated into a cable connecting between the display peripheral and the host. Alternatively, a signal converter wherein the USB interface is an adapter between a cable connecting between the display peripheral and the host, and wherein the adapter mates to an end of the cable.

Yet another object is for a signal converter, further comprising a colorimeter, wherein the colorimeter communicates with the host and is used to establish colorimetry of the display peripheral.

An object of the invention is a converter for enabling a computer display peripheral to connect through a USB interface to a host computer to enable some features to be controlled, comprising a cable with non-USB connections to the computer display peripheral and the host computer, and a USB connection interconnected to the cable. There is a translating means for communicating between the computer display peripheral and the host computer, as well as a controller coupled to the translating means, wherein the controller manages an exchange of data between the computer display peripheral and the host computer.

An additional object is a converter, further comprising a user interface to implement colorimetry adjustments to the display peripheral.

Further object includes a converter, further comprising a user interface to implement geometry adjustments to the display peripheral.

Yet another object is a converter, further comprising a user interface allowing manual adjustment of the display peripheral. Alternatively, a converter, wherein the converter operates under program control.

An object of the invention is a method for communicating with a display peripheral through a USB interface, comprising the steps of linking the USB interface to a connection between the display peripheral and a computer, processing bi-directional communications between the display peripheral and the computer in a normal fashion, switching a converter to a master mode when the converter is sent USB commands from the computer, translating USB communications from the computer to the display peripheral when in the master mode, translating display peripheral communications from the display peripheral to the computer when in the master mode, and changing display peripheral settings based upon status and commands when in the master mode from the USB communications and from the display peripheral communications.

Additional object includes a method, wherein the step of linking is an adapter connecting to the connection between the display peripheral and the computer, wherein the connection is a cable. Another object is for a method, wherein the step of linking is an integrated connection to the connection between the display peripheral and the computer, wherein the connection is a cable.

Yet a further object is a method, wherein the step of linking the USB interface is done by attaching a cable between the computer and the display peripheral, wherein the cable has embedded electronics and the USB interface.

And an even further object is for a method, wherein the method for communicating is via software control over a local network. Additionally, a method wherein the method for communicating is via software control over an Internet connection.

A final object is for a method, further comprising a step of allowing a user interface at the computer.

Still other objects and advantages of the present invention will become readily apparent to those skilled in this art from the following detailed description, wherein only a preferred embodiment of the invention is described, simply by way of illustration of the best mode contemplated for carrying out the invention. As will be realized, the invention is capable of other and different embodiments, and its several details are capable of modifications in various obvious respects, all without departing from the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF THE PREFERRED EMBODIMENT

Figure 1:
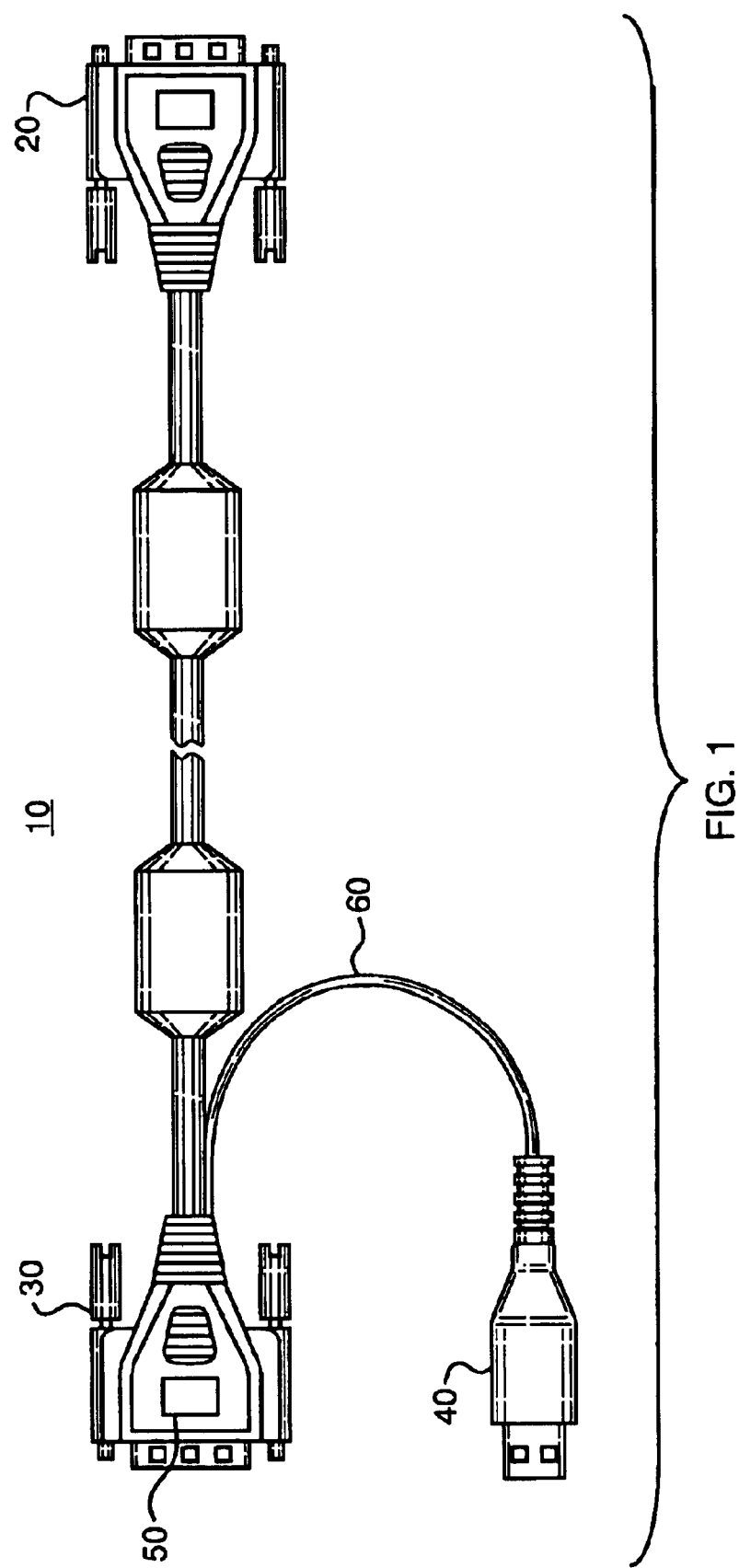
FIG. 1 VGA/USB cable embodiment of converter with circuit imbedded

The physical representation of the cable of the preferred embodiment is shown in FIG. 1. The cable 10 has three connectors, a display peripheral plug 20, a computer plug 30, and a USB plug 40. The processing electronics is located within the plug housing 50 and allows the system to operate in a normal mode or via the USB mode. The USB plug 40 is a male adapter that branches off from the computer plug and plugs into a USB port on a hub or on the computer. The length of the pigtail 60 cable is ten inches in the preferred embodiment. The cable 10 is reversible, so the USB plug 40 and associated electronics can be located closer to the computer or closer to the display peripheral depending upon the location of the USB mating connection. In the preferred embodiment the electronics are designed into a custom circuit that is small enough to fit inside a standard DM15M connector.

In the preferred embodiment, the electronics enables an I2C interface that is used to communicate to a VESA compliant display peripheral. The processor within the connector is used to perform the task of communicating to the host computer via the USB interface and communicating to the display peripheral using the DDC2bi protocol as specified by VESA.

Figure 2:
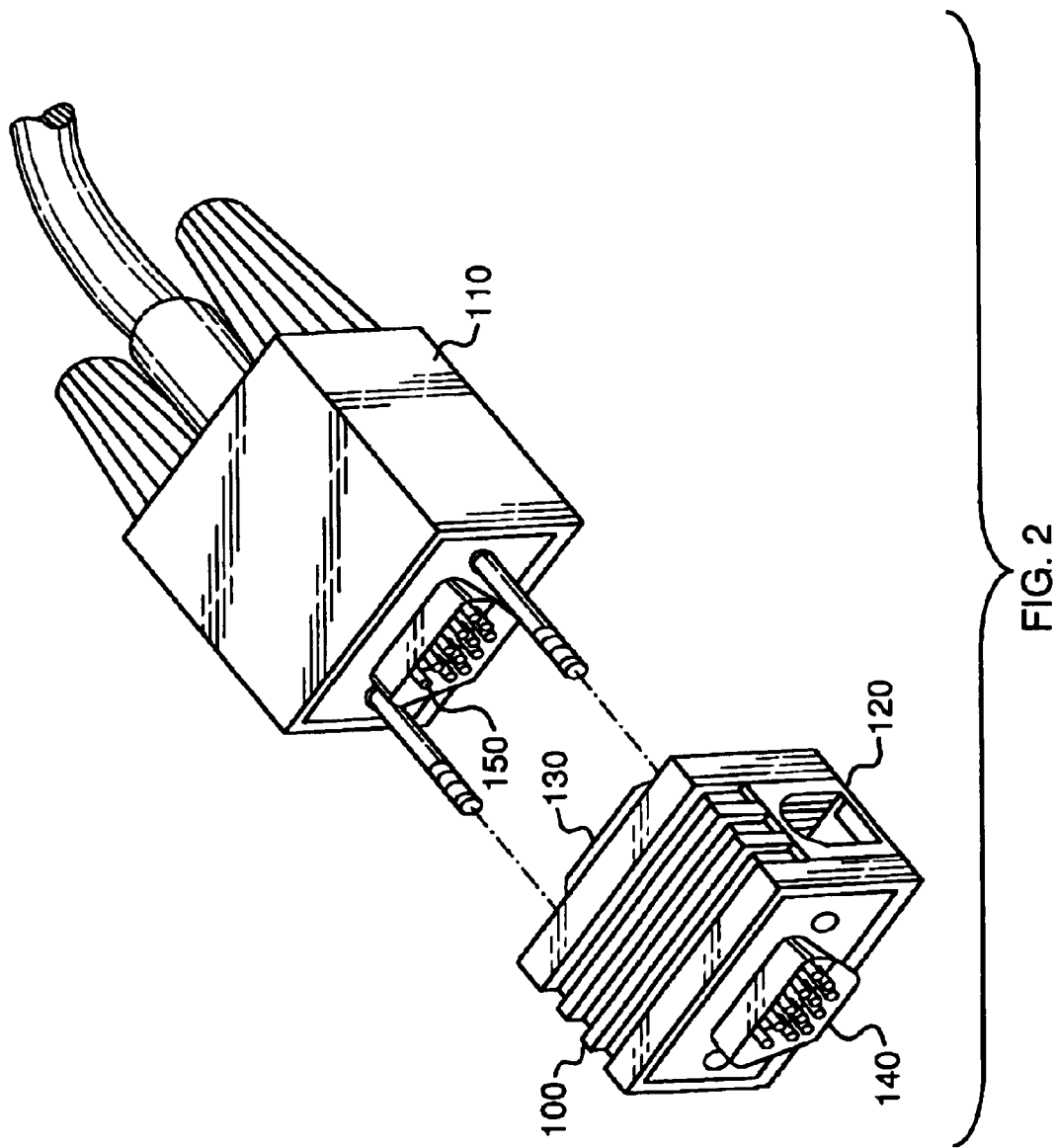
FIG. 2 Adapter for VGA cable with USB female port

Another embodiment is illustrated in FIG. 2, wherein an adapter 100 houses the electronics and the adapter 100 connects to the display peripheral connector 110. The adapter has a USB/DDC2bi display peripheral connection and there is a USB port 120 on the adapter 100 for display peripheral control. In this embodiment, the VGA standard connector cable 110 has an enable adapter 100 containing a USB-female type B connection 120. The adapter 100 encompasses a VGA female connection (DB15F) 130 on one side of the adapter 100 and a VGA male connection (DB15M) 140 on the opposing side. The female connection 130 attaches to the VGA cable male connection 150.

Figure 3:
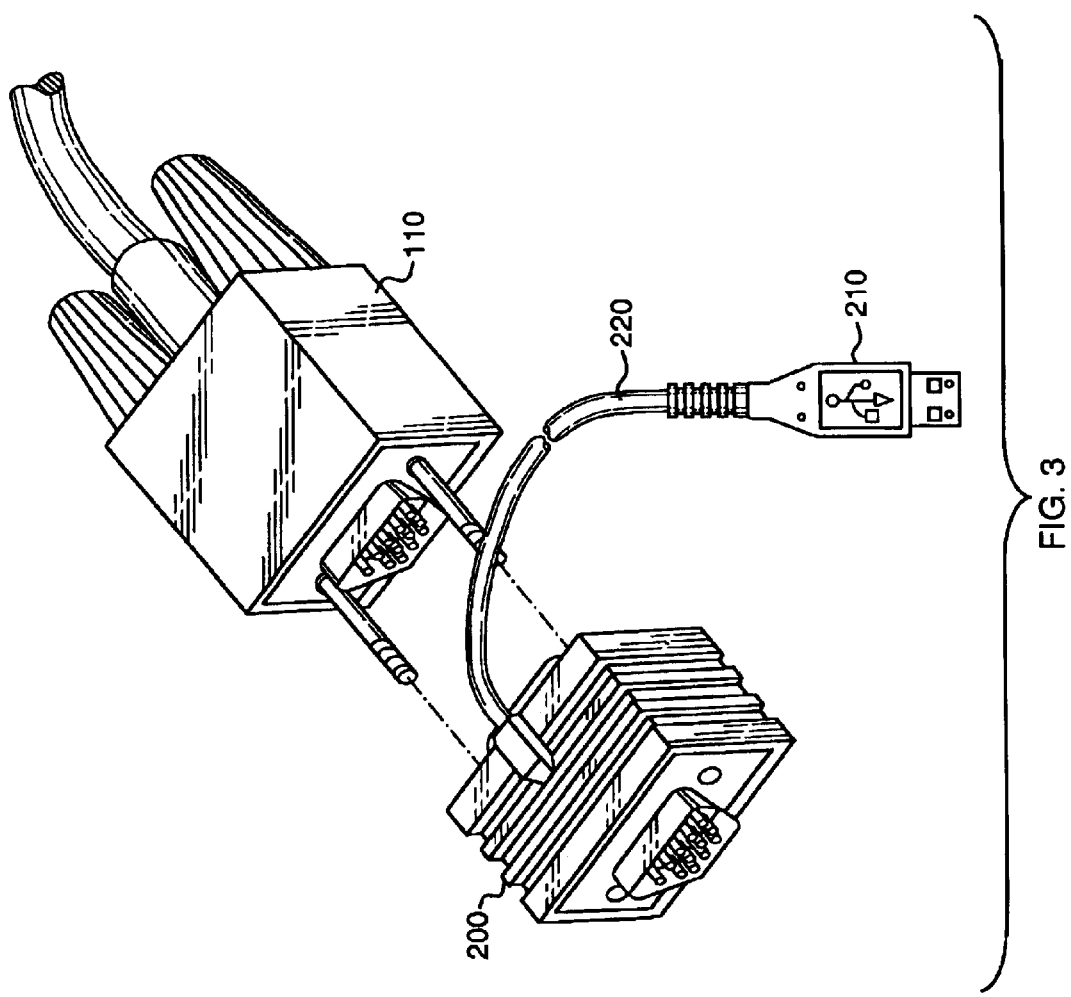
FIG. 3 Adapter for VGA cable with USB male port pigtail

In FIG. 3, another embodiment features a VGA standard cable (DB15M) 110 with an enable adapter 200 that has a pigtail 220 off the enable adapter 200 with a USB-male connection 210. The length of the pigtail 220 can vary, although ten inches is used in the preferred embodiment.

Figure 4:
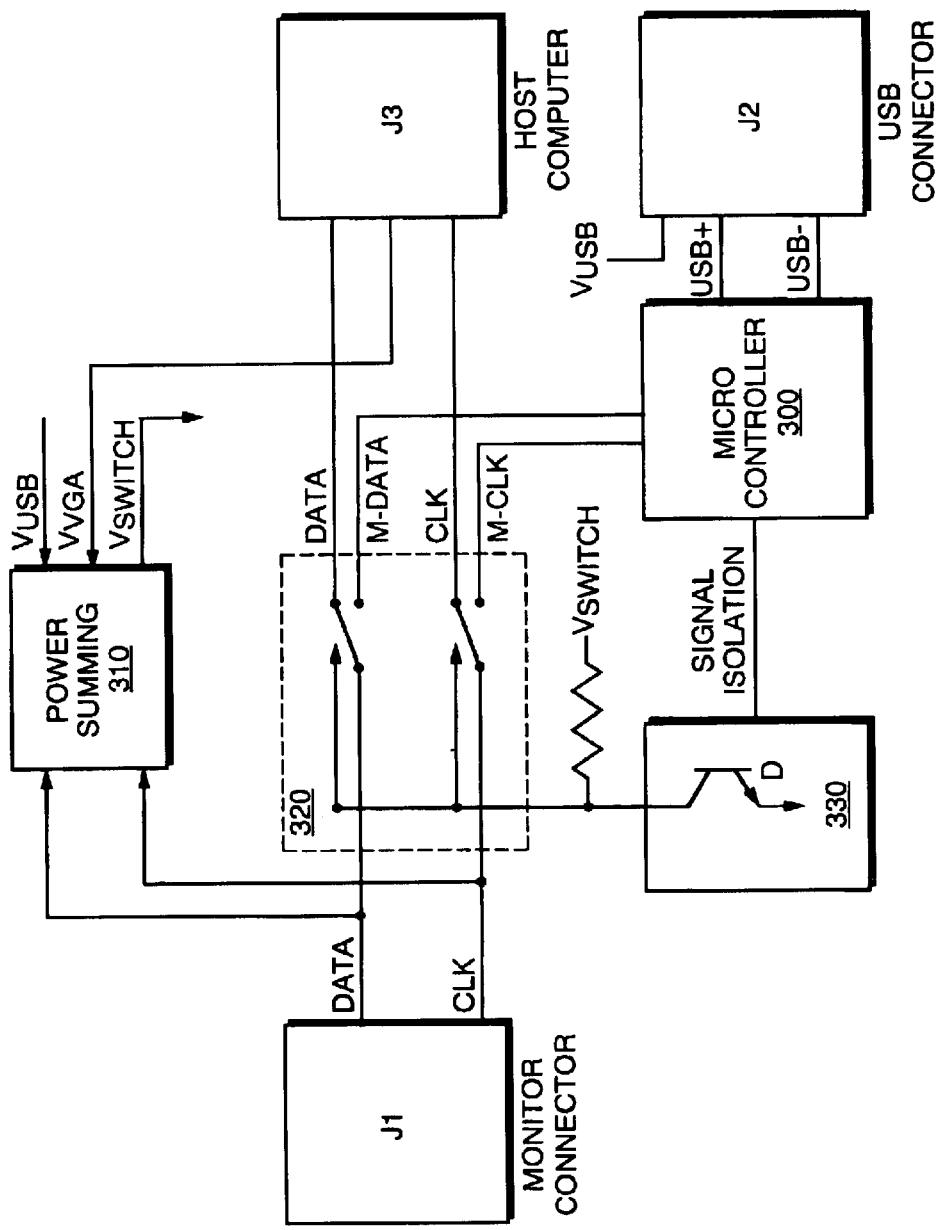
FIG. 4 Circuit schematic for converter

An idealized schematic of the present invention is presented in FIG. 4. There are three basic elements that interact to form a preferred embodiment of the invention: power management circuit 310, pass through switch 320, and the microprocessor 300.

The microprocessor or microcontroller 300 is used to control the communications between the display peripheral, the host, and USB interface. Typically a VGA cable connects from the host computer to the display peripheral, while the USB connection J2 can be integrated into the cable or as an adapter. Signals to/from the host computer are routed through connector J3. Communications to the display peripheral are routed through J1. USB communications are on J2.

An operational consideration for this circuit is that one cannot guarantee that each connection to the board will be made in a particular order. An additional constraint comes from the fact that the USB can be hot-plugged, which means that various portions of the circuit can be in de-energized at anytime.

An important feature of the present invention is that it must work exactly like a normal cable even when there is no power to the microprocessor 300. During the power-up sequence, the display device is constantly sending identification information to the host via the Data line in the VGA connector. Such information is important for proper operation, so the signal lines must be intact. However, during the boot up sequence of the host computer, there is no guarantee that power will be applied constantly to the circuit of the disclosed invention. As a matter of fact, the power is often interrupted during this sequence to ensure complete power on reset of all the peripherals.

The pass through switch 320 contains transistor switches and must be energized during the power up sequence. If the pass through does not occur, critical display peripheral identification information will not be found. This fact has a large impact on the power supply design.

The power supply circuit 310 is designed to scavenge power from all potential signal and power lines. Essentially, every line that may have a positive voltage is used in a diode isolated summing network to form the power grid for the cable. The power lines all connect at a capacitor within the power summing section 310 that serves to the form the power for the switch, Vswitch.

The power to the microcontroller 300 is isolated from the switch power Vswitch and the microcontroller control line for the switch is also isolated. When a signal is present on any line from the display peripheral to the host computer, the switch 320 is automatically energized by the signal. Diode isolation prevents the signal from being effected by the power line.

Referring to the idealized schematic, the Data and Clock lines from the display peripheral connector J1 are routed to the power summing circuit 310 and the pass through switch 320. When voltage is applied to the switch 320, it is activated to pass through the signals from the display peripheral to the host computer along the Data and Clock lines. The voltage to the switch, Vswitch is used as the control line to the switch as well.

Signal isolation between the switch and the microcontroller 300 is accomplished using a transistor 330 to form the signal connection. When the microcontroller 300 is not powered, the transistor acts as an isolating diode 330. When the microcontroller 300 is powered, the transistor 330 is driven by the microcontroller 300. The microcontroller 300 is powered only by the USB power line.

When it is necessary for the microcontroller 300 to send signals along lines M-Data and M-Clk to the display peripheral, the microcontroller 300 is powered up and the microcontroller processes the signals to make sure they are valid communications. The control line to the isolation switch 330 is energized, which causes the transistor in the isolation circuit 330 to pull the switch control line low. This sets the switch 320 to pass through M-DATA and M-CLK signals to the display peripheral. This switch arrangement provides complete isolation of the M-DATA and M-CLK lines, to insure that the cable does not have any effect on the host system.

Figure 5:
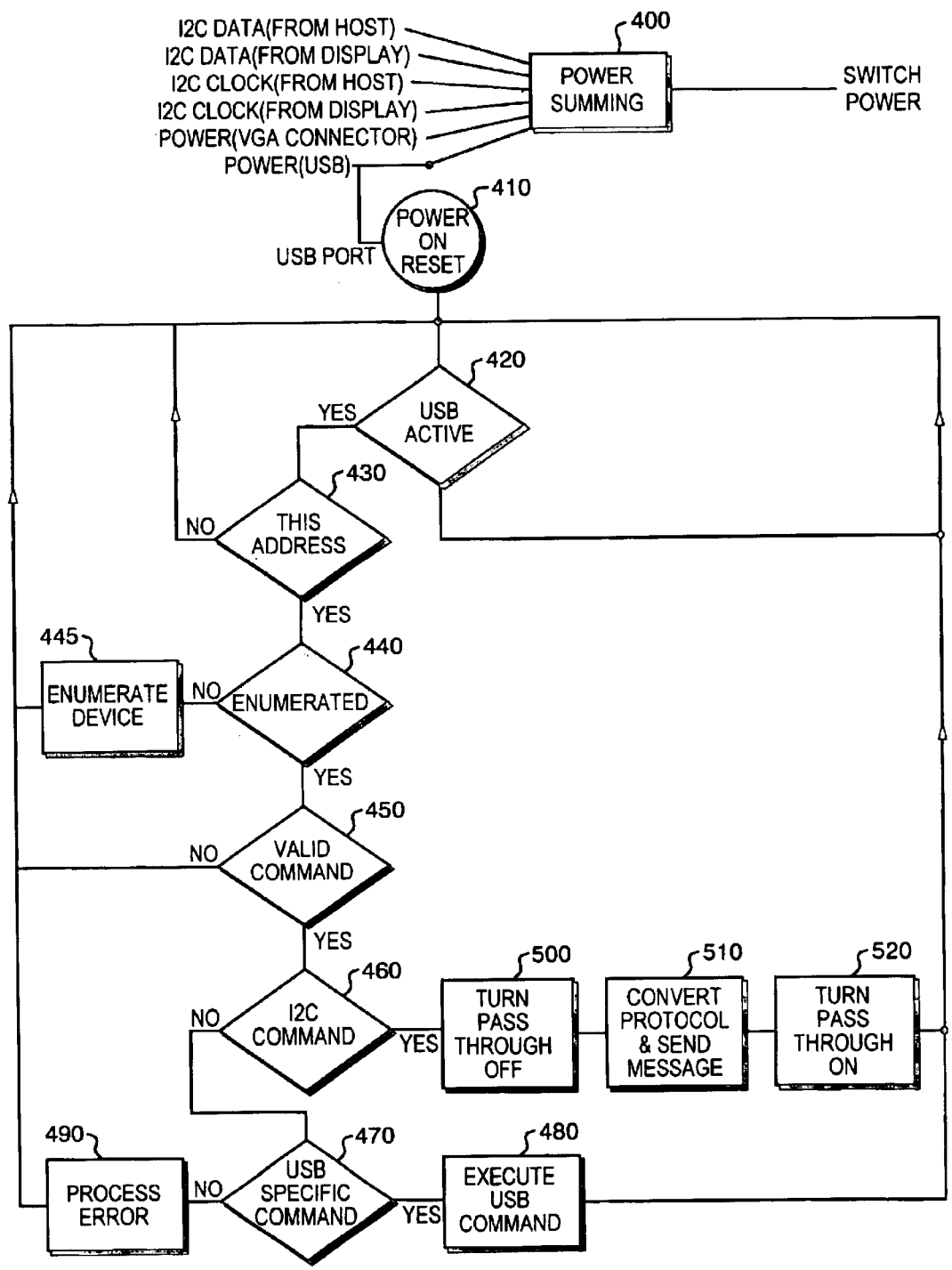
FIG. 5 Flowchart of microcontroller functions

FIG. 5 is a flow chart illustrating the logical sequences that occur in the microprocessor. As stated herein, any positive potential signal can power the switch. The input power is derived from the switching section. The first step in the process is the Power Summing 400, wherein the power summing circuit uses all relevant signals to derive power for the switch The I/O signals I2C Data (from host), I2C Data (from display), I2C Clock (from host), I2C Clock (from host), Power (VGA connector), and Power (USB) are all connected to the power summing circuit.

The USB power is also tied to the USB circuit. When the USB power is applied, the processor initiates a Power On Reset 410. It then enters an idle loop.

The next step checks if USB Activity is Detected 420. The processor monitors all communications and detects any USB communications. If there is no activity, the processor remains in the idle loop. If there is USB Activity 420, the processor checks to see if it has the correct USB Address 430. All USB signals contain a designation address and a pipe address in order to talk to different devices or different communication sections of the device. If the USB activity was not addressed to the processor, as determined by the correct USB Address and pipe 430 the processor returns to the idle loop.

If the address is correct, the system checks if the device has been Enumerated 440. At power-up, all USB devices are requested to enumerate themselves, which is a form of status polling to see if the device is networked and functioning as well as to relay device information. The device sends information about the manufacturer and device designation as part of the hardware section of the chip in conjunction with the firmware in the chip. The processor must provide such information before it can send and receive commands. If the host processor is sending commands to the device and it has not Enumerated 440, then the device must be enumerated before proceeding to communicate. Thus, if not Enumerated 440, the next step is to Enumerate Device 445 to obtain the device information and return the system to the idle loop.

If the device was Enumerated 440, the next step is to check for a Valid Command 450. An invalid command returns the processor to the idle state. If it is a valid command it is checked to see if it is an I2C Command 460 to be sent to the display peripheral or valid USB Command to be processed by the microcontroller.

If it is an I2C Command 460, (e.g., transaction command for the display peripheral), the next step is to Turn Pass Through Off 500, then Convert Protocol and Send Message 510, where the message is routed to protocol conversion firmware and the command is sent to the display peripheral. Then the next step of Turn Pass Thru On 520 is executed in which the pass through switch is then turned on once more.

If the command is not a transaction command for the display peripheral, it is then checked to determine if it is a USB Specific Command 470. If it is a USB Specification Command 470 the system performs the step of Execute USB Command 480.

If it is not a USB Specific Command 470, then it is a Process Error 490 and the system performs an error handling routine and returns to the idle loop.

The present invention has been particularly shown and described with respect to certain preferred embodiments of features. However, it should be readily apparent to those of ordinary skill in the art that various changes and modifications in form and details may be made without departing from the spirit and scope of the invention. The invention is capable of other and different embodiments and its several details are capable of modifications in various obvious respects, all without departing from the essence of the invention. Additional objects and advantages of the present invention may be further realized and attained by means of the instrumentalities and combinations all within the scope of the claims. The drawings and description are to be regarded as illustrative in nature, and not as restrictive.

What is claimed is:

1. A signal converter for converting Universal Serial Bus (USB) communication and display peripheral communication between a host and a display peripheral, comprising:

a power management section for providing power to said signal converter, wherein said power management section employs power scavenging capability to extract power from multiple signal lines as well as standard sources of power;

a switching section for maintaining standard communications between said display peripheral and said host, wherein said switching section is adapted to switch to a USB interface allowing communication between said host and said display peripheral through said USB interface; and a controller for managing said switching section and translating said USB communication to said display peripheral communication and translating display peripheral communication to said USB communication.

2. A signal converter according to claim 1, wherein said display peripheral communication complies with Video Electronics Standards Association (VESA) Display Data Channel (DDC) communications protocol.

3. A signal converter according to claim 1, wherein said switching section is in a default position for maintaining said standard communications.

4. A signal converter according to claim 1, wherein said signal converter is integrated into a cable connecting said display peripheral and said host.

5. A signal converter according to claim 1, wherein said signal converter is an adapter adapted for coupling with a cable for connecting said display peripheral and said host.

6. A signal converter according to claim 1, further comprising a colorimeter, wherein said colorimeter communicates with said host and is used to establish colorimetry of said display peripheral.

7. A signal converter according to claim 1, further comprising a connection adapted for coupling said display peripheral and said host, wherein said connection is further adapted to couple with said USB interface.

8. A converter for enabling a computer display peripheral to connect through a USB interface to a host computer, comprising:

a cable with non-USB connections adapted for coupling to said computer display peripheral and said host computer;

a power management section adapted with power scavenging capability;

a USB connection interconnected to said cable; and a controller embedded in said cable, and adapted for managing an exchange of data between said computer display peripheral and said host computer, and translating communication between said computer display peripheral and said host computer.

9. A converter according to claim 8, wherein said converter operates under program control.

10. A method for communicating with a display peripheral through a USB interface, wherein said USB interface is linked to a connection between said display peripheral and a computer, and a converter included in the connection carries out the method, the method comprising:

scavenging power from signal lines as well as standard sources of power to power said converter;

processing bi-directional communications between said display peripheral and said computer in a normal fashion;

switching to a master mode when said converter receives USB commands from said computer;

translating USB communications from said computer to said display peripheral when in said master mode; and translating display peripheral communications from said display peripheral to said computer when in said master mode.

11. A method according to claim 10, further comprising changing display peripheral settings based upon status and commands from said USB and display peripheral communications.

* * * * *